(12) United States Patent
Momoshima et al.

(10) Patent No.: US 12,027,049 B2
(45) Date of Patent: Jul. 2, 2024

(54) AUTOMATED VALET PARKING SYSTEM, AND METHOD FOR PROVIDING AUTOMATED VALET PARKING SERVICE

(71) Applicant: TOYOTA JIDOSHA KABUSHIKI KAISHA, Toyota (JP)

(72) Inventors: Shogo Momoshima, Nagoya (JP); Ryuji Okamura, Gotemba (JP); Atsushi Okubo, Nisshin (JP); Takaaki Kato, Saitama (JP); Daiki Kaneichi, Tokyo-to (JP); Minoru Nakadori, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 29 days.

(21) Appl. No.: 17/863,760

(22) Filed: Jul. 13, 2022

(65) Prior Publication Data
US 2023/0037218 A1 Feb. 2, 2023

(30) Foreign Application Priority Data
Jul. 27, 2021 (JP) .................................. 2021-122770

(51) Int. Cl.
*G08G 1/14* (2006.01)
*G06Q 10/02* (2012.01)
*G06Q 10/0631* (2023.01)

(52) U.S. Cl.
CPC ............. *G08G 1/148* (2013.01); *G06Q 10/02* (2013.01); *G06Q 10/06315* (2013.01); *G08G 1/146* (2013.01)

(58) Field of Classification Search
CPC ........ G08G 1/148; G08G 1/146; G08G 1/143; G08G 1/144; G06Q 10/02; G06Q 10/06315; B62D 15/0285
See application file for complete search history.

(56) References Cited

U.S. PATENT DOCUMENTS

| | | | |
|---|---|---|---|
| 10,169,995 B2* | 1/2019 | Bostick | G08G 1/146 |
| 10,755,570 B1* | 8/2020 | Zhou | B62D 15/0285 |
| 2017/0267233 A1* | 9/2017 | Minster | B60W 30/06 |
| 2018/0005338 A1 | 1/2018 | Kazama et al. | |
| 2020/0130676 A1* | 4/2020 | Smid | G05D 1/0212 |
| 2020/0175870 A1* | 6/2020 | Oh | G06V 20/52 |
| 2020/0180607 A1* | 6/2020 | Choi | G08G 1/166 |
| 2020/0307648 A1 | 10/2020 | Noguchi et al. | |
| 2020/0311641 A1 | 10/2020 | Noguchi et al. | |
| 2020/0388155 A1* | 12/2020 | Mukaiyama | G08G 1/148 |
| 2021/0142671 A1* | 5/2021 | Takato | G08G 1/065 |

(Continued)

FOREIGN PATENT DOCUMENTS

| | | |
|---|---|---|
| JP | 2018-5532 A | 1/2018 |
| JP | 2019-196136 A | 11/2019 |

(Continued)

*Primary Examiner* — An T Nguyen
(74) *Attorney, Agent, or Firm* — Sughrue Mion, PLLC

(57) ABSTRACT

A management device of an automated valet parking system predicts a usage schedule of an automated valet parking service used by a user from usage history information about a usage history of the automated valet parking service used by the user. Then, the management device determines a parking position of a vehicle of the user among multiple parking lots with reference to the predicted usage schedule.

9 Claims, 4 Drawing Sheets

(56) References Cited

U.S. PATENT DOCUMENTS

| | | | | |
|---|---|---|---|---|
| 2021/0162989 A1* | 6/2021 | Ahn | ................ | G08G 1/146 |
| 2021/0245735 A1* | 8/2021 | Wang | ................ | G08G 1/143 |
| 2021/0331665 A1* | 10/2021 | Sugano | ............ | G08G 1/202 |
| 2021/0380096 A1 | 12/2021 | Katoh et al. | | |
| 2022/0065652 A1* | 3/2022 | Herman | ............ | G01C 21/3685 |
| 2022/0144250 A1* | 5/2022 | Hidaka | ............ | G08G 1/16 |
| 2022/0172623 A1* | 6/2022 | Hidaka | ............ | G08G 1/146 |
| 2022/0274586 A1* | 9/2022 | Tokuhiro | ........ | B60W 30/18109 |
| 2022/0392349 A1* | 12/2022 | Momoshima | ........ | G08G 1/144 |

FOREIGN PATENT DOCUMENTS

| | | |
|---|---|---|
| JP | 2020-027474 A | 2/2020 |
| JP | 2020-166634 A | 10/2020 |
| JP | 2020-166767 A | 10/2020 |
| WO | 2020/095672 A1 | 5/2020 |

* cited by examiner

AUTOMATED VALET PARKING SYSTEM, AND METHOD FOR PROVIDING AUTOMATED VALET PARKING SERVICE

CROSS-REFERENCE TO RELATED APPLICATION

The present application claims priority under 35 U.S.C. § 119 to Japanese Patent Application No. 2021-122770, filed Jul. 27, 2021, the contents of which application are incorporated herein by reference in their entirety.

BACKGROUND

Field

The present disclosure relates to a technique for providing an automated valet parking service using multiple parking lots.

Background Art

An example of a technique related to an automated valet parking service is disclosed in JP 2019-196136 A. With the technique that is disclosed in JP 2019-196136 A, a parking reservation including information about a desired time slot for parking, a disembarkation position of a user of a self-driving vehicle, and the like is accepted by a management device. Based on the accepted parking reservation, the management device allocates a parking lot in an area under its purview to the self-driving vehicle. The management device also creates a driving plan for the self-driving vehicle to move to the allocated parking lot based on congestion status estimated from trends of other vehicles expected to run through the area under its purview.

With the technique that is disclosed in JP 2019-196136 A, the driving plan to drive to the allocated parking lot is created so as to avoid a jam when the vehicle is stored in the parking lot.

However, congestion can occur in the parking lot not only at the time of storage, but also at the time of retrieval from the parking lot. The technique disclosed in JP 2019-196136 A does not discuss smooth retrieval. The technique disclosed in JP 2019-196136 A assumes that there are multiple parking lots in the area under the purview of the management device. However, the technique disclosed in JP 2019-196136 A has room for improvement in terms of efficient use of the multiple parking lots for realization of smooth retrieval.

Note that examples of literature that indicate the technical level in the technical field of the present disclosure at the time of disclosure include JP 2020-166634 A, JP 2020-166767 A and JP 2020-027474 A in addition to JP 2019-196136 A.

SUMMARY

The present disclosure has been made in view of the above problems. An object of the present disclosure is to provide a technique that allows multiple parking lots to be used efficiently in providing the automated valet parking service.

The present disclosure provides an automated valet parking system. The automated valet parking system according to the present disclosure provides an automated valet parking service using a plurality of parking lots. The automated valet parking system includes an information storage device that stores usage history information about a usage history of the automated valet parking service used by a user and a management device that manages a parking position of a vehicle of the user among the plurality of parking lots. The management device is configured to predict a usage schedule of the automated valet parking service used by the user, based on the usage history information stored in the information storage device and determine the parking position with reference to the predicted usage schedule.

In the automated valet parking system according to the present disclosure, when determining the parking position, the management device may select a parking lot to be used to park the vehicle from the plurality of parking lots with reference to the predicted usage schedule. Besides, when determining the parking position, the management device may select a parking space to be used to park the vehicle in the parking lot to be used, with reference to the predicted usage schedule.

In the automated valet parking system according to the present disclosure, when determining the parking position, the management device may refer to a usage schedule of the automated valet parking service used by another user, in addition to the usage schedule of the automated valet parking service used by the user.

In the automated valet parking system according to the present disclosure, the usage history information may include information about a retrieval time at which the user retrieves the vehicle from the parking lot. Also, the usage history information may include information about a retrieval day on which the user retrieves the vehicle from the parking lot. Furthermore, the usage history information may include information about a departure/arrival depot used by the user for retrieval of the vehicle.

The present disclosure provides a method for providing an automated valet parking service, and more specifically, a method for providing an automated valet parking service using a plurality of parking lots. The method for providing an automated valet parking service according to the present disclosure includes the following steps. A first step involves storing usage history information about a usage history of the automated valet parking service used by a user. A second step involves predicting a usage schedule of the automated valet parking service used by the user based on the stored usage history information. A third step involves determining a parking position of a vehicle of the user among the plurality of parking lots with reference to the predicted usage schedule.

The present disclosure provides a program to be executed by a computer. The program according to the present disclosure causes a computer manage a parking position of a vehicle of a user among a plurality of parking lots in order to provide an automated valet parking service that uses the plurality of parking lots. The program according to the present disclosure causes a computer perform the following processes. A first process involves acquiring usage history information about a usage history of the automated valet parking service used by a user. A second process involves predicting a usage schedule of the automated valet parking service used by the user based on the acquired usage history information. A third process involves determining the parking position of a vehicle of the user with reference to the predicted usage schedule.

According to the present technique, a user's usage schedule of an automated valet parking service is predicted based on the automated valet parking service usage history of the user. Then, the parking position of the vehicle of the user among multiple parking lots is determined with reference to the predicted usage schedule of the automated valet parking service. This allows multiple parking lots to be used efficiently in providing the automated valet parking service.

DETAILED DESCRIPTION

An embodiment of the present disclosure will be described below with reference to drawings. However, when a number, such as the number of elements of each kind, a quantity, an amount and a range, is stated in the embodiment shown below, the idea according to the present disclosure is not limited to the stated number unless the stated number is clearly specified or clearly theoretically identified. Further, structures and the like described in the embodiment shown below are not necessarily indispensable for the idea according to the present disclosure unless the structures and the like are clearly specified or clearly theoretically identified.

1. Configuration of Automated Valet Parking Facilities

Figure 1:
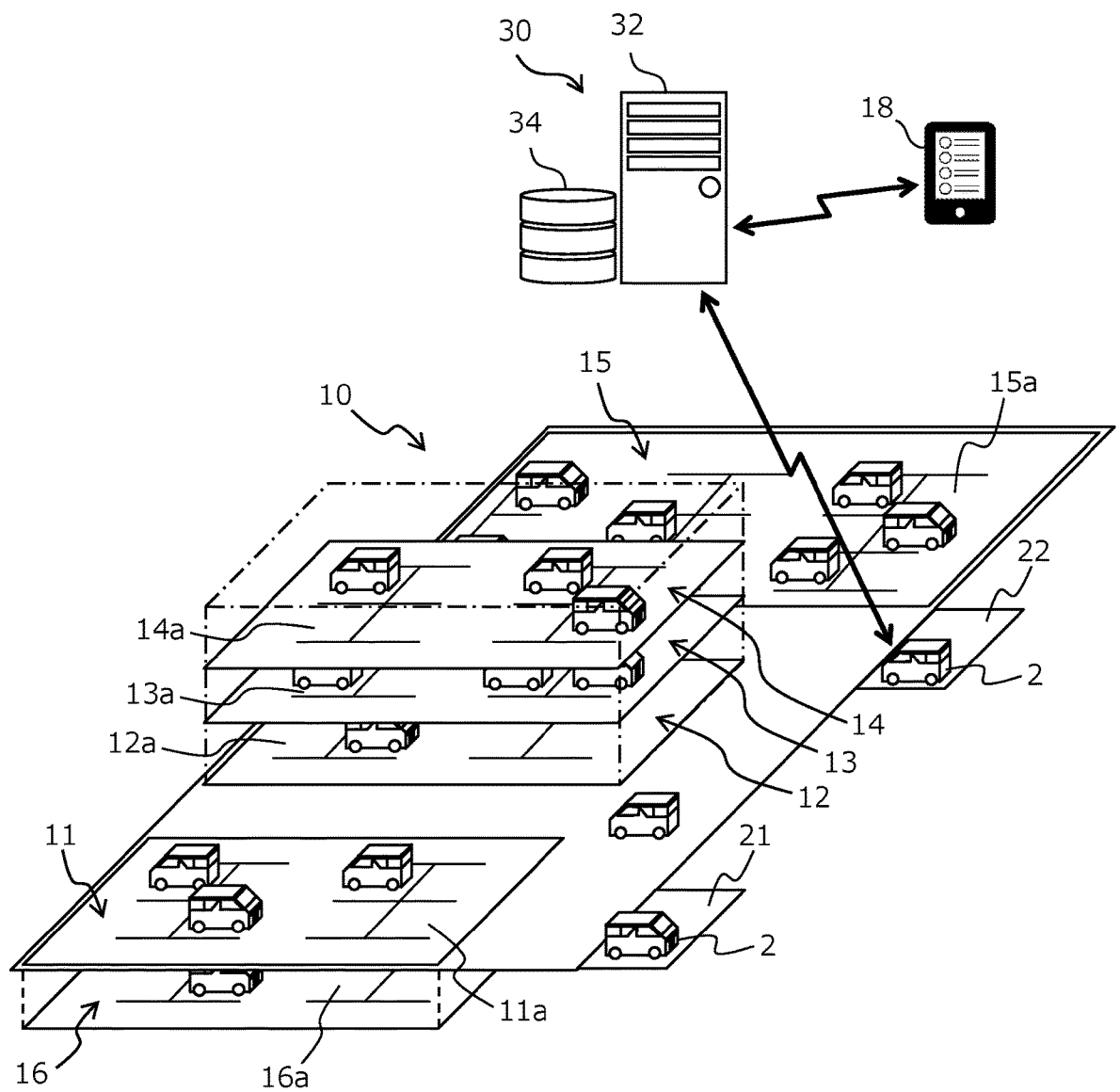
FIG. 1 is a schematic diagram of automated valet parking facilities resulting from application of an automated valet parking system according to an embodiment of the present disclosure.

FIG. 1 is a schematic diagram of automated valet parking facilities 10 resulting from application of an automated valet parking system 30 according to an embodiment of the present disclosure. The automated valet parking system 30 according to the present embodiment provides an automated valet parking service in the automated valet parking facilities 10 having configurational features such as illustrated by example in FIG. 1. The automated valet parking service provided by the automated valet parking system 30 includes allocation of parking spaces to vehicles 2 in the automated valet parking facilities 10 and movement of the vehicles 2 in the automated valet parking facilities 10.

The automated valet parking facilities 10 include departure/arrival depots where users get on and off the vehicles 2. In the example shown in FIG. 1, two departure/arrival depots—a first departure/arrival depot 21 and a second departure/arrival depot 22—are provided. Both departure/arrival depots 21 and 22 are large enough for multiple vehicles 2 to depart/arrive at the same time. Each user leaves his/her vehicle 2 with the automated valet parking system 30 at any one of the departure/arrival depots 21 and 22. The user also receives the vehicle 2 from the automated valet parking system 30 at any one of the departure/arrival depots 21 and 22. Note that the departure/arrival depots may be provided by being divided into a departure depot for retrieval and an arrival depot for storage. The departure/arrival depots do not necessarily have to be annexed to the automated valet parking facilities 10. The departure/arrival depots may be provided in the living quarters where the users live or at entry/exit points of the towns where the users live.

The automated valet parking facilities 10 include multiple parking lots where the users' vehicles 2 are parked. In the example shown in FIG. 1, six parking lots—first to sixth parking lots 11, 12, 13, 14, 15, and 16—are provided. The first parking lot 11 is a relatively small-scale flat parking lot located near the first departure/arrival depot 21. The second parking lot 12, the third parking lot 13, and the fourth parking lot 14 make up a multi-story parking garage provided in a building. The fifth parking lot 15 is a relatively large-scale flat parking lot located near the second departure/arrival depot 22. The sixth parking lot 16 is an underground parking lot provided in the ground beneath the first parking lot 11. Each of the parking lots 11, 12, 13, 14, 15, and 16 are provided with multiple parking spaces 11a, 12a, 13a, 14a, 15a, or 16a.

The vehicles 2 that can use the automated valet parking facilities 10 are vehicles supported by the automated valet parking service. As long as the vehicles 2 are supported by the automated valet parking service, the vehicles 2 may be private vehicles, sharing service vehicles, or MaaS vehicles. The vehicles supported by the automated valet parking service include vehicles capable of autonomous driving at least within the automated valet parking facilities 10 and vehicles capable of remote driving by a remote driver at least within the automated valet parking facilities 10. Even if a vehicle is supported by neither autonomous driving nor remote driving, the vehicle can be moved within the automated valet parking facilities 10 by being placed on a self-propelled transport bogie. That is, basically any vehicle 2 is supported by the automated valet parking service and can use the automated valet parking facilities 10. Note that various publicly-known methods are available for use as an automated valet parking method and the present disclosure places no restrictions on the automated valet parking method itself, and thus detailed description of the automated valet parking method will be omitted.

2. Configuration of Automated Valet Parking System

The automated valet parking system 30 includes a management device 32 and information storage device 34. The management device 32 is a computer connected to the vehicles 2 (or a self-propelled transport bogie that transports the vehicles 2) via a wireless network. The management device 32 is also connected to portable terminals 18 of users via the wireless network. The management device 32 manages membership information about the users of the automated valet parking service and performs various processes necessary for implementation of the automated valet parking service, including reservations and authentication for use of the automated valet parking facilities 10. The management device 32 also manages parking positions of the vehicles 2 within the automated valet parking facilities 10. The management device 32 also guides the vehicles 2 at the time of storage from either of the departure/arrival depots 21 and 22 to any of the parking lots 11 to 16 and guides the vehicles 2 at the time of retrieval from any of the parking lots 11 to 16 to either of the departure/arrival depots 21 and 22.

The information storage device 34 is a built-in or outboard storage of the management device 32, or a data server connected to the management device 32 via a network. The information storage device 34 stores membership information about the users or reservation information on the automated valet parking facilities 10. The information storage device 34 stores automated valet parking service usage history of each user. Each time the user uses the automated valet parking service, new data is added to the user's usage history in the information storage device 34.

The portable terminals 18 is a terminal capable of wireless communications and capable of being carried by the respective users. As some examples of the portable terminals 18, a smartphone and a tablet PC can be mentioned. Each of the portable terminals 18 stores registration information associating the portable terminal 18 with the vehicle 2. If an automated valet parking application, which is a dedicated application, is downloaded onto the portable terminal 18 and started, various functions will become available for use, including reservations for use of the automated valet parking facilities 10, automated vehicle storage in any of the parking lots 11 to 16, and automated retrieval from any of the parking lots 11 to 16. The portable terminal 18 is connected to the management device 32 via the wireless network.

Figure 2:
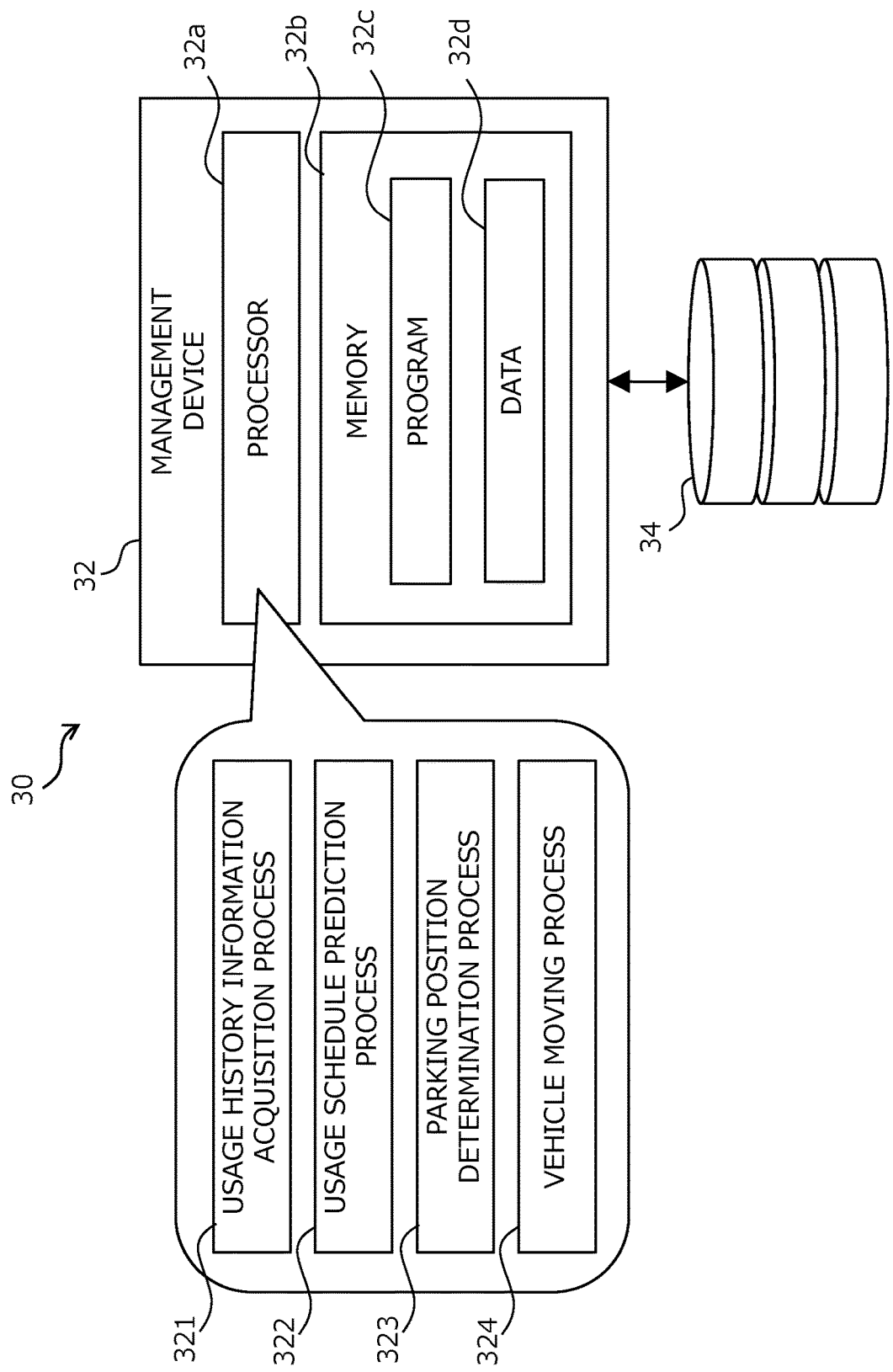
FIG. 2 is a block diagram showing a configuration of the automated valet parking system according to the embodiment of the present disclosure.

Next, configuration of the automated valet parking system 30 will be described in detail with reference to FIG. 2. The management device 32 configuring the automated valet parking system 30 includes at least one processor 32a (hereinafter referred to simply as the "processor 32a") and at least one memory 32b (hereinafter referred to simply as the "memory 32b") coupled to the processor 32a. The memory 32b stores at least one program 32c (hereinafter referred to simply as the "program 32c") executable by the processor 32a and various data 32d related to the program 32c. The memory 32b includes main storage and auxiliary storage. The program 32c and the data 32d may be stored either in the main storage or in a computer-readable recording medium, which is the auxiliary storage.

The program 32c includes a program for use to make the processor 32a manage the parking positions of the vehicles 2 within the automated valet parking facilities 10. The data 32d includes parking lot map information that in turn includes information about positions of each parking lot 11 to 16 in the automated valet parking facilities 10 and information about positions of the parking space 11a to 16a in each parking lot. When the above program is executed by the processor 32a, the management device 32 (processor 32a) performs a usage history information acquisition process 321, a usage schedule prediction process 322, a parking position determination process 323, and a vehicle moving process 324.

The usage history information acquisition process 321 is a process of acquiring the information about a usage history of a user's automated valet parking service from the information storage device 34 when the user makes a reservation for the use of the automated valet parking facilities 10. For example, the usage history information acquisition process 321 acquires a reservation for the use of the automated valet parking system 30 as the reservation is entered by the user via the portable terminal 18 and searches the information storage device 34 for stored data using a user ID contained in the reservation. The usage history information stored in the information storage device 34 contains information about the dates, days, and times on/at which the user retrieved the vehicle as well as information about the departure/arrival depots used by the user for retrieval. The usage history information may also contain information about the dates, days, and times on/at which the user stored the vehicle as well as information about the departure/arrival depots used by the user for storage.

The usage schedule prediction process 322 is a process of predicting a user's usage schedule of the automated valet parking service when a vehicle 2 is left in the automated valet parking facilities 10 by the user. With the automated valet parking system 30, when the user uses the automated valet parking service, i.e., when the user leaves the vehicle 2 in the automated valet parking facilities 10, there is no need for the user to enter a usage schedule including the expected date and time of retrieval and the departure/arrival depot to be used at the time of retrieval. The usage schedule is predicted from the usage history information acquired by the usage history information acquisition process 321. Details of the usage schedule prediction process 322 will be described later. Note that the prediction of the usage schedule may be made when the reservation for the use of the automated valet parking service is made by the user.

The parking position determination process 323 is a process of determining the parking position of the vehicle 2 left in the automated valet parking facilities 10 by the user. The automated valet parking facilities 10 include the multiple parking lots 11 to 16, and roads to the departure/arrival depots 21 and 22 and traffic conditions thereof vary among the parking lots 11 to 16. While each of the parking lots 11 to 16 is provided with multiple parking spaces 11a to 16a, the roads to the departure/arrival depots 21 and 22 also vary with the positions of the parking spaces 11a to 16a within the parking lots 11 to 16. Furthermore, when multiple vehicles 2 move within the automated valet parking facilities 10, lines of flow may overlap or intersect among the vehicles 2 at the time of retrieval depending on the parking positions of the vehicles 2. By taking these factors into consideration, the parking position determination process 323 determines the parking positions of the respective vehicles 2 such that the vehicles 2 can be retrieved smoothly. Details of the parking position determination process 323 will be described later.

The vehicle moving process 324 is a process of moving the vehicles 2 according to the parking positions determined in the parking position determination process 323. The vehicle 2 left in the automated valet parking facilities 10 may be parked at a fixed parking position from storage to retrieval or may have its parking position changed multiple times. Whether the parking position of the vehicle 2 is changed until retrieval depends on the predicted usage schedule of the user and is affected by the usage schedules of other users as well. When a retrieval request for the vehicle 2 arrives at the management device 32 from the portable terminal 18 of a user, the vehicle 2 is moved from its parking position to whichever one of the departure/arrival depots 21 and 22 the user specifies. The vehicle moving process 324 moves the vehicle 2 by self-driving if the vehicle 2 has a self-driving function, or moves the vehicle 2 by remote driving if the vehicle 2 has a remote driving function. If the vehicle 2 has neither a self-driving function nor a remote driving function, the vehicle moving process 324 moves the vehicle 2 using a self-propelled transport bogie.

Figure 3:
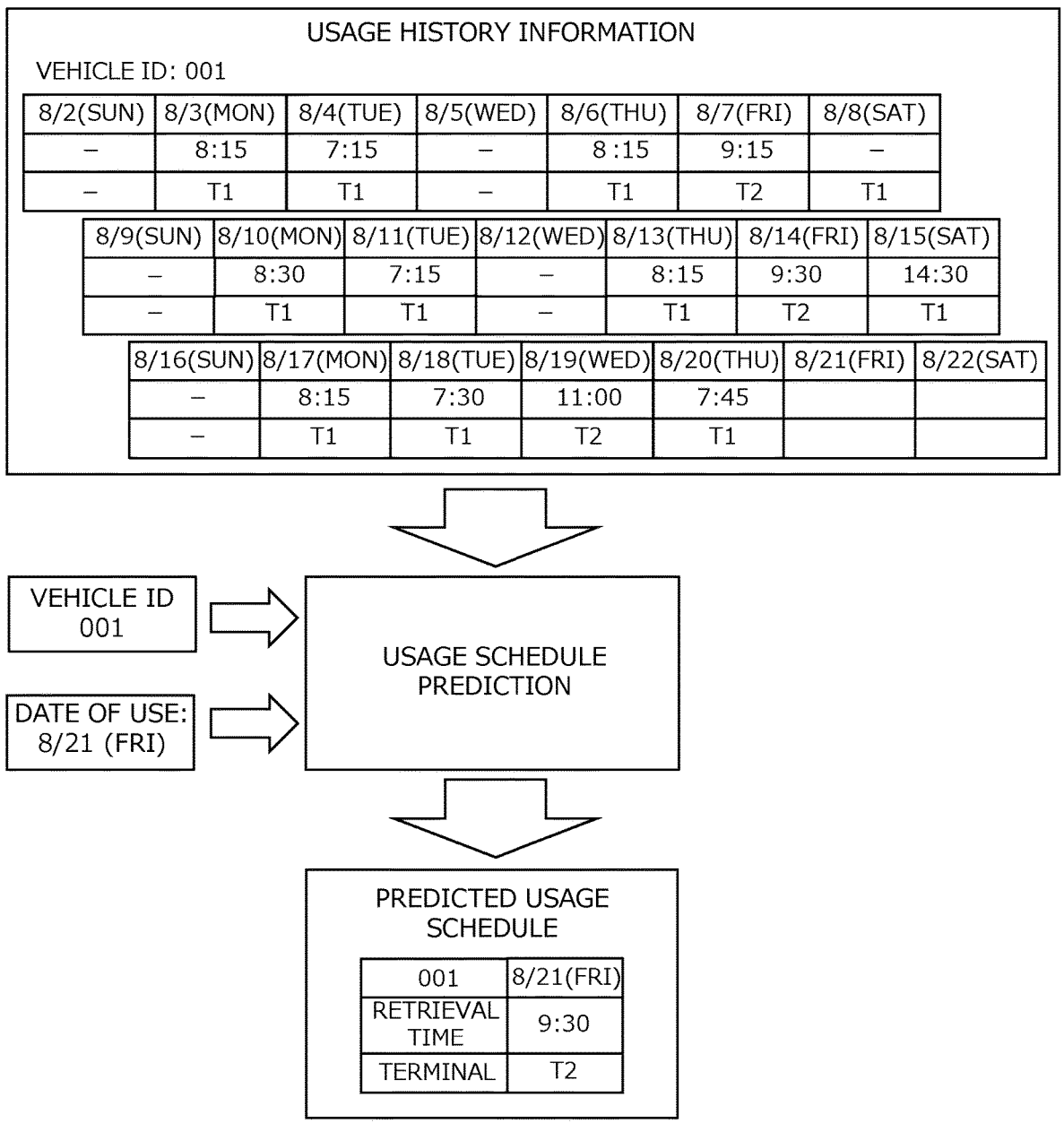
FIG. 3 is a diagram for explaining a usage schedule prediction process performed by a management device according to the embodiment of the present disclosure.

3. Details of Usage Schedule Prediction Process and Parking Position Determination Process FIG. 3 is a diagram for explaining the usage schedule prediction process 322 performed by the management device. The usage schedule prediction process 322 uses usage history information about the user's usage history of the automated valet parking service. In the example shown in FIG. 3, the usage history information is associated with an ID of the vehicle 2. Although it is also possible to associate the usage history information with a user ID, the vehicle 2 is not necessarily owned by a private owner. Thus, it is more preferable to manage the usage history information by a vehicle ID than by a user ID.

In the example shown in FIG. 3, the usage history information contains the time at which the user retrieved the vehicle 2 on each date and the departure/arrival depot used by the user for retrieval. Note that in FIG. 3, T1 indicates the first departure/arrival depot 21 and T2 indicates the second departure/arrival depot 22. It can be seen from the usage history information shown in FIG. 3 that, for example, the vehicle 2 with a vehicle ID of 001 is retrieved from the first departure/arrival depot 21 at 7:30 every Tuesday, but never retrieved on Sunday. If today is Thursday, August 20, the usage schedule prediction process 322 predicts the usage schedule of the vehicle 2 with the vehicle ID of 001 for the next day, Friday, August 21. In the example shown in FIG. 3, since the retrieval time was 9:15 and the departure/arrival depot for retrieval was T2 on a week ago last Friday and the retrieval time was 9:30 and the departure/arrival depot for retrieval was T2 on the last Friday, it is predicted that on Friday this week, i.e., the next day, Friday, August 21, the retrieval time will be 9:30 and the departure/arrival depot for retrieval will be T2. The usage schedule prediction process 322 makes statistical predictions using a mathematical model.

Figure 4:
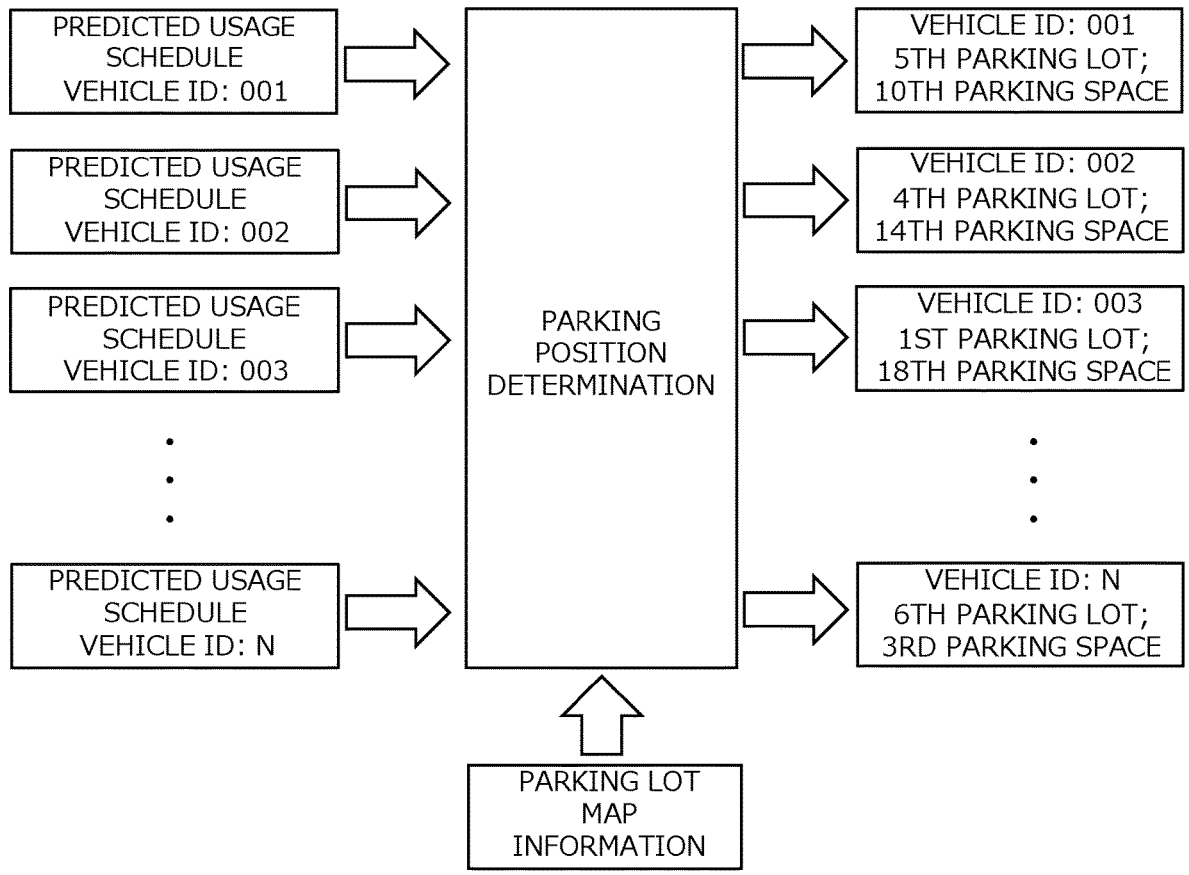
FIG. 4 is a diagram for explaining a parking position determination process performed by the management device according to the embodiment of the present disclosure.

FIG. 4 is a diagram for explaining the parking position determination process 323 performed by the management device 32. The parking position determination process 323 uses the usage schedule predicted in the usage schedule prediction process 322. Let us assume here that a vehicle 2 with the vehicle ID of 001 is left in the automated valet parking facilities 10 by a user. In this case, the parking position determination process 323 refers to the predicted usage schedule associated with the vehicle ID of 001 and, at the same time, predicted usage schedules of other vehicles 2 left in the automated valet parking facilities 10. In the example shown in FIG. 4, the parking position determination process 323 refers to the predicted usage schedules of multiple vehicles 2 with vehicle IDs of 002 to N in addition to the predicted usage schedule of the vehicle 2 with the vehicle ID of 001.

In the parking position determination process 323, to realize smooth retrieval, basically the earlier the retrieval time of a vehicle 2, the closer to the departure/arrival depots 21 and 22 the car is parked. That is, the earlier the retrieval time of a vehicle 2, the parking lot closer to the departure/arrival depots 21 and 22 in parking lots 11 to 16 from the first to sixth is selected as the parking lot to be used. Furthermore, the parking space closest to the entry/exit point of the selected parking lot is selected as the parking space to be used.

Conversely, a vehicle 2 with a late retrieval time is parked at a parking position distant from the departure/arrival depots 21 and 22. Suppose, for example, it is predicted that the vehicle 2 with a vehicle ID of 002 and the vehicle 2 with a vehicle ID of N are not expected to be retrieved for some time. In the example shown in FIG. 4, the vehicle 2 with a vehicle ID of 002 is assigned to the fourth parking lot 14 located on the top floor of a multi-story parking garage as the parking lot to be used. The vehicle 2 with a vehicle ID of N is assigned to the sixth parking lot 16 located in the ground beneath the first parking lot 11 as the parking lot to be used. In this way, by causing the vehicle 2 with a late retrieval time to park at a parking position distant from the departure/arrival depots 21 and 22 and causing the vehicle 2 with an early retrieval time to park preferentially near the departure/arrival depots 21 and 22, it is possible to reduce moving distances and thereby realize smooth retrieval.

When the retrieval of the vehicles 2 with early retrieval times is finished, vacancies occur in parking lots and parking spaces close to the departure/arrival depots 21 and 22. In this case, the parking position determination process 323 redetermines parking positions to move vehicles 2 parked at locations distant from the departure/arrival depots 21 and 22 to vacant parking lots and parking spaces. However, in this case again, the parking positions of the respective vehicles 2 are determined with reference to the predicted usage schedules of the respective vehicles 2, such that the earlier the retrieval time of the vehicles 2, the closer the allocated parking lots and parking spaces of the vehicles 2 will be to the departure/arrival depots 21 and 22.

The parking position determination process 323 refers to all the predicted usage schedules inputted and comprehensively determines optimum parking positions for all the vehicles 2. Suppose, for example, it is predicted that the vehicle 2 with a vehicle ID of 003 and the vehicle 2 with the vehicle ID of 001 will be retrieved from the first departure/arrival depot 21 at the same time. In this case, if the vehicle 2 with the vehicle ID of 001 and the vehicle 2 with the vehicle ID of 003 are parked in the same parking lot, the lines of flow will overlap at the time of retrieval, obstructing smooth retrieval. On the other hand, if the vehicle 2 with the vehicle ID of 001 is parked in the first parking lot 11 and the vehicle 2 with the vehicle ID of 003 are parked in the fifth parking lot 15, the lines of flow will intersect at the time of retrieval, obstructing smooth retrieval.

Thus, in the example shown in FIG. 4, the vehicle 2 with the vehicle ID of 001 is parked in the fifth parking lot 15 by the side of the second departure/arrival depot 22 and the vehicle 2 with the vehicle ID of 003 is parked in the first parking lot 11 by the side of the first departure/arrival depot 21. Consequently, smooth retrieval of the two vehicles 2 is realized. All the vehicles 2 moving in the automated valet parking facilities 10 are checked for overlap and intersection of lines of flow in the same manner as this example. The parking lot map information is used in checking for overlap and intersection of lines of flow among the vehicles 2.

As described above, the automated valet parking system 30 according to the present embodiment predicts a user's usage schedule of the automated valet parking service from the usage history information about the usage history of the automated valet parking service used by the user. Then, the automated valet parking system 30 determines the parking position of the user's vehicle among the multiple parking lots 11 to 15 with reference to the predicted usage schedule. In so doing, the automated valet parking system 30 refers to other users' usage schedule of the automated valet parking service. This makes it possible to provide the automated valet parking service efficiently using multiple parking lots 11 to 15.

4. Other Embodiments

When the departure/arrival depot at the time of retrieval as predicted from the predicted usage schedule differs from the departure/arrival depot actually desired by the user if the departure/arrival depot actually desired by the user cannot realize smooth retrieval, a proposal may be made to the user to change the departure/arrival depot. The user may be offered some incentive to accept the proposal.

What is claimed is:

1. An automated valet parking system that provides an automated valet parking service using a plurality of parking lots, comprising:
   an information storage device configured to store usage history information about a usage history of the automated valet parking service used by a plurality of users, wherein the information storage device is a built-in or outboard storage of a management device;

the management device configured to manage, for a user from among the plurality of users, a parking position of a vehicle of the user among the plurality of parking lots; wherein the management device comprises at least one processor and at least one memory that stores at least one program, and is executable by the at least one processor, wherein the management device is configured to:

connect to a portable terminal of the user via a wireless network, receive a user request from the portable terminal of the user via the wireless network, based upon the user request, predict a usage schedule of the automated valet parking service used by the plurality of users, based on the usage history information stored in the information storage device, determine the parking position of the vehicle of the user among the plurality of parking lots with reference to the usage schedule of the plurality of users, and autonomously move the vehicle from a current position to the determined parking position among the plurality of parking lots.

2. The automated valet parking system according to claim 1, wherein the management device is configured to, when determining the parking position, select a parking lot to be used to park the vehicle from the plurality of parking lots with reference to the usage schedule.

3. The automated valet parking system according to claim 2, wherein the management device is configured to, when determining the parking position, select a parking space to be used to park the vehicle in the parking lot to be used, with reference to the usage schedule.

4. The automated valet parking system according to claim 1, wherein the management device is configured to, when determining the parking position, refer to another user's usage schedule of the automated valet parking service in addition to the usage schedule of the user.

5. The automated valet parking system according to claim 1, wherein the usage history information includes information about a retrieval time at which the user retrieves the vehicle from the parking lot.

6. The automated valet parking system according to claim 1, wherein the usage history information includes information about a retrieval day on which the user retrieves the vehicle from the parking lot.

7. The automated valet parking system according to claim 1, wherein the usage history information includes information about a departure/arrival depot used by the user for retrieval of the vehicle.

8. A method for providing an automated valet parking service using a plurality of parking lots, using at least one processor, the method comprising:

storing usage history information about a usage history of the automated valet parking service used by a plurality of users;

receiving, via a wireless network, a user request from a portable terminal of a user from among the plurality of users;

based upon the user request, predicting a usage schedule of the automated valet parking service used by the plurality of users based on the usage history information; and determining a parking position of a vehicle of the user among the plurality of parking lots with reference to the usage schedule of the plurality of users among the plurality of parking lots; and autonomously moving the vehicle from a current position to the determined parking position among the plurality of parking lots.

9. A non-transitory computer-readable storage medium storing a program that is configured to cause a computer to execute:

managing, for a user from among a plurality of users, a parking position of a vehicle of the user among a plurality of parking lots in order to provide an automated valet parking service using the plurality of parking lots;

acquiring usage history information about a usage history of the automated valet parking service used by a user;

connecting to a portable terminal of the user via a wireless network, receiving a user request from the portable terminal of the user via the wireless network, based upon the user request, predicting a usage schedule of the automated valet parking service used by the plurality of users based on the acquired usage history information;

determining the parking position of the vehicle of the user among the plurality of parking lots with reference to the usage schedule of the plurality of users; and autonomously moving the vehicle from a current position to the determined parking position among the plurality of parking lots.

* * * * *